United States Patent Office 3,185,665
Patented May 25, 1965

3,185,665
LINEAR POLYESTERS OF METHYLENE-4,4'-BIS
(2-CHLORO-1-NAPHTHOL)
Ronald F. Lange, Wilmington, Del., assignor to E. I. du
Pont de Nemours and Company, Wilmington, Del.,
a corporation of Delaware
No Drawing. Filed July 6, 1962, Ser. No. 208,097
4 Claims. (Cl. 260—47)

This invention relates to a novel class of dihydric phenols of high molecular weight, as well as to polyesters which may be derived therefrom. Fibers, films, and other shaped structures which may be made from the polyesters are also comprehended.

In accordance with the present invention, it has been found that 2-substituted-1-naphthols (Formula I) can be reacted with formaldehyde in the presence of acid to form methylene-4,4'-bis(1-naphthol) derivatives (Formula II):

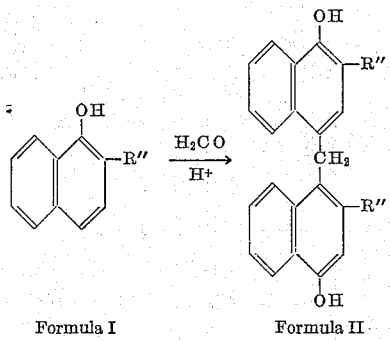

Formula I        Formula II wherein R'' represents carboxyl, halogen, alkyl, or other radicals not reactive with formaldehyde. When R'' represents alkyl, the radical preferably contains from 1 to about 4 carbon atoms. The reaction is conveniently carried out in glacial acetic acid with the addition of concentrated hydrochloric acid. Typical instances of substituted 1-naphthols which may be reacted with formaldehyde, and the products which may be derived therefrom, are 2-chloro-1-naphthol to produce methylene-4,4'-bis(2-chloro-1-naphthol); 2-bromo-1-naphthol to produce methylene-4,4'-bis(2-bromo-1-naphthol); 1-hydroxy-2-napthoic acid to produce methylene-4,4'-bis(2-carboxy-1-naphthol); 2-methyl-1-naphthol to produce methylene-4,4'-bis(2-methyl-1-naphthol); and 2-butyl-1-naphthol to produce methylene-4,4'-bis(2-butyl-1-naphthol).

Unsubstituted methylene-4,4'-bis(1-naphthol) is not produced by the simple reaction of 1-naphthol with formaldehyde, since this leads to the formation of a resin. However, 4,4'-bis(1-naphthol) can be produced by the decarboxylation of methylene-4,4'-bis(2-carboxy-1-naphthol); e.g., decarboxylation by heating the compound with soda lime or refluxing with aqueous sodium bisulfite.

The novel dihydric phenols of the invention, therefore, comprehend the class of compounds of Formula III:

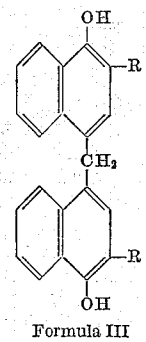

Formula III wherein R is hydrogen or R'', as defined above.

The invention also comprehends linear condensation polyesters of dicarboxylic acids and the novel dihydric phenols of Formula III, except where R represents carboxyl; i.e., except for polyesters of dimethylene-4,4'-bis(2-carboxy-1-naphthol). The novel linear polyesters of the invention may be illustrated as possessing recurring units as shown in Formula IV:

$$-O-\underset{}{\bigodot}\overset{R'}{-}CH_2-\underset{}{\bigodot}\overset{R'}{-}O-\overset{O}{\overset{\|}{C}}-(A)_n-\overset{O}{\overset{\|}{C}}-$$

Formula IV wherein R' represents hydrogen, halogen, or alkyl (preferably, an alkyl radical containing from one to about four carbon atoms), $n$ is 0 or 1, and A is a divalent organic radical corresponding to the radical A in the starting material dicarboxylic acid, $A(COOH)_2$. Preferably, radical A contains from 4 to about 20 carbon atoms and is composed primarily of carbon and hydrogen but may contain, in addition to the attachment to the two carboxyl groups, other non-hydrocarbon components or substituents which are inert in the polyesterification reaction. For example, halogen substituents may be present, as well as ether, carbonyl, sulfide, sulfoxide, or sulfonyl radicals. Mixtures of the dicarboxylic acids may be employed.

Typical examples of acids which may be employed with the dihydric phenols to prepare the polyesters of the invention include oxalic acid, succinic acid, adipic acid, sebacic acid, dodecanedioic acid, isophthalic acid, terephthalic acid, chloroterephthalic acid, fluoroterephthalic acid, bromoterephthalic acid, hexahydroterephthalic acid, bis(4-carboxyphenyl)ether, bis(4-carboxyphenyl)ketone, bis(4-carboxyphenyl)sulfide, bis(3-carboxyphenyl) sulfoxide, and bis(3-carboxyphenyl)sulfone.

The novel polyesters of the invention may be prepared by any of a variety of polycondensation methods described in the prior art. Thus, the desired dihydric phenol may be reacted with the desired diacid chloride in substantially equimolar quantities at high temperature (150–250° C.) in an inert solvent. The same reaction can be carried out at lower temperatures with the addition of a tertiary amine as an acid acceptor, preferably with strong agitation. The polyesters may also be prepared by an interfacial polymerization procedure by dissolving the dihydric phenol in aqueous alkali, dissolving the diacid chloride in a water-immiscible organic solvent, adding a catalyst such as a quaternary ammonium salt, and combining the two phases with vigorous agitation. Other known methods may be employed to form the polymers. For instance, the diacetate of the dihydric phenol may be reacted with the dicarboxylic acid at elevated temperature and reduced pressure in the presence of a catalyst such as sodium acetate; or the dihydric phenol may be reacted with the diphenyl ester of the dicarboxylic acid in the presence of sodium acetate.

The following examples will serve to describe the preparation of the novel dihydric phenols of the present invention, as well as polyesters derived therefrom. The examples are not intended to be limitative.

In the examples, "polymer melting temperature" is defined as the gross melting temperature determined by heating a polymer sample slowly and observing the lowest temperature at which a slight pressure causes permanent deformation of the sample.

The term "inherent viscosity," as used herein, is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent. The concentration ($c$) used in the examples is 0.5 gram of polymer per 100 ml. of solution, and the measurements are made at 30° C. The solvent employed in the examples comprises a mixture of 40 weight percent sym-tetrachloroethane and 60 weight percent phenol.

*Example 1*

To a solution of 48.0 g. of 2-chloro-1-naphthol (0.2688 mol) in 180 ml. of glacial acetic acid is added 10.89 g. of 37% aqueous formaldehyde (4.02 g. formaldehyde on an anhydrous basis; 0.1344 mol). Twelve ml. of 37% hydrochloric acid is then added, after which the vessel is stoppered and the solution is allowed to stand for 24 hours at room temperature. The resulting crystalline mass is filtered off, washed with 225 ml. of glacial acetic acid, and dried overnight in a vacuum oven at 100° C. The product, methylene-4,4'-bis(2-chloro-1-naphthol), comprises 40.6 g. of pale yellow needles (82% yield) having a melting point of 219–220° C. (cor.). After four recrystallizations of the product from glacial acetic acid, almost colorless needles are obtained; however, the melting point remains unchanged. Cryoscopic molecular weight determinations in 1,2-dibromoethane give values of 378 and 379 (theoretical 369). The results obtained upon analysis for carbon and hydrogen are:

C=68.08% (theoretical 68.31%);
H=3.85% (theoretical 3.82%).

The product readily dissolves in alkali to give a blue solution.

Substitution of 0.2688 mol of 2-methyl-1-naphthol for 2-chloro-1-naphthol in the above procedure results in the production of methylene-4,4'-bis(2-methyl-1-naphthol). Similarly, methylene-4,4'-bis(2-bromo-1-naphthol) is obtained by substituting 0.2688 mol of 2-bromo-1-naphthol for the 2-chloro-1-naphthol starting material.

*Example 2*

To a filtered solution of 16.84 g. of 1-hydroxy-2-naphthoic acid (0.0896 mol) in 1100 ml. of glacial acetic acid is added 3.63 g. of 37% aqueous formaldehyde (1.34 g. of formaldehyde on an anhydrous basis; 0.0448 mol). To this solution is added 56 ml. of 37% hydrochloric acid, after which the vessel is stoppered and allowed to stand for 88 hours at room temperature. A fine yellow solid separates from the solution and this product, methylene-4,4'-bis(2-carboxy-1-naphthol), is washed with 200 ml. of glacial acetic acid and dried overnight in a vacuum oven at 100° C. The yield is 13.24 g. (76% of theoretical). Recrystallization of the product from glacial acetic acid gives light yellowish-brown needles which decompose with effervescence at 280° C. The results obtained upon analysis for carbon and hydrogen are:

C=70.76% (theoretical 71.15%);
H=4.27% (theoretical 4.12%).

The product readily dissolves in alkali to give a blue solution.

Refluxing a sample of the methylene-4,4'-bis(2-carboxy-1-naphthol) with aqueous sodium bisulfite solution, followed by acidification with dilute hydrochloric acid, yields methylene-4,4'-bis(1-naphthol).

*Example 3*

To a three-necked, round-bottom flask equipped with a reflux condenser, addition funnel, nitrogen gas inlet system packed with silica gel, and a stirrer is added 12.0 g. of methylene-4,4'-bis(2-chloro-1-naphthol) in 93 ml. of purified o-dichlorobenzene. The mixture is heated to dissolve the dihydric phenol and a small amount (3 ml.) of o-dichlorobenzene is distilled out to remove any water from the system (reflux condenser jacket left empty during distillation). A flow of water is initiated through the jacket of the reflux condenser and a fresh solution of 7.84 g. of sebacyl chloride (0.0328 mol) in 40 ml. of purified o-dichlorobenzene, prepared in a nitrogen dry box, is added to the stirred refluxing solution over a period of five minutes. Refluxing and stirring of the solution is continued for 48 hours, after which an additional 400 ml. of o-dichlorobenzene is added, followed by one liter of n-hexane. The product, poly[methylene-4,4'-bis(2-chloro-1-naphthylene)sebacate], is an off-white, opaque solid having a polymer melting temperature of 160° C. and an inherent viscosity of 0.21. The yield is 13.65 g. (78% of theoretical). Orientable fibers are spun at 165° C. from a sample of the polymer. The polymer dissolves in chloroform to form a 10% solution, from which a film is readily cast.

*Example 4*

A solution consisting of 4.61 g. of methylene-4,4'-bis-(2-chloro-1-naphthol) (0.0125 mol) and 1.0 g. of tetraethylammonium chloride in 150 ml. of an aqueous solution of 1.0 g. of sodium hydroxide (0.0250 mol) is placed in a high powered agitator (Waring Blendor, powerstat setting 110). While rapidly agitating the solution a second solution is added, comprising 2.54 g. of isophthalyl chloride (0.0125 mol) in 30 ml. of 1,1,2-trichloroethane, prepared in a nitrogen dry box. The two-phase system is vigorously agitated for a period of 10 minutes. The reaction mixture is then poured into 700 ml. of acetone and the resulting precipitate is filtered off, pulverized, washed in the agitator with 500 ml. of water and then with 500 ml. of a 1:1 mixture of alcohol and water. The product, poly[methylene-4,4'-bis(2-chloro-1-naphthylene)isophthalate], is dried overnight in a vacuum oven. The yield is 3.34 g. (54% of theoretical). The polymer remains infusible at temperatures exceeding 400° C. and is insoluble in tetrachloroethane-phenol solvent, so that no inherent viscosity measurement can be made.

*Example 5*

The following solutions are prepared in separate flasks in a nitrogen dry box:

(1) A solution of 6.0 g. of methylene-4,4'-bis(2-chloro-1-naphthol) (0.0162 mol) and 3.28 g. of triethylamine (0.0325 mol) in 50 ml. of tetrahydrofuran (distilled over sodium and blanketed under nitrogen) and (2) A solution of 3.33 g. of isophthalyl chloride (0.0162 mol) in 50 ml. of dry tetrahydrofuran.

Solution (1) is transferred to a high powered agitator and, while it is being agitated, solution (2) is added as rapidly as possible. Immediate separation of a white polymer takes place; however, vigorous agitation of the mixture is continued for 7 minutes. The product, poly-[methylene - 4,4' - bis(2-chloro-1-naphthylene)isophthalate] is then filtered off, washed with 300 ml. of 95% alcohol, and dried overnight in a vacuum oven at 50° C. It has a polymer melting temperature of 325° C. and an inherent viscosity of 0.17. The yield is 6.24 g. (77% of theoretical). Orientable fibers are melt spun at 325° C. from a sample of the polymer.

Since many different embodiments of the invention may be made without departing from the spirit and scope

I claim:
1. Poly[methylene - 4,4' - bis(2-chloro-1-naphthylene) sebacate].
2. Poly[methylene - 4,4' - bis(2-chloro-1-naphthylene) isophthalate].
3. Fibers of a polyester as defined in claim 1.
4. Fibers of methylene-4,4'-bis(2-chloro-1-naphthylene)isophthalate linear polyester.

References Cited by the Examiner

UNITED STATES PATENTS

| | | | |
|---|---|---|---|
| 2,057,676 | 10/36 | Graves | 260—619 |
| 2,636,905 | 4/53 | Kehe et al. | 260—619 |
| 2,730,553 | 1/56 | Williamson | 260—619 |
| 2,880,234 | 3/59 | Maxion | 260—47 |

FOREIGN PATENTS 863,703  3/61  Great Britain.

WILLIAM H. SHORT, *Primary Examiner.*